Jan. 23, 1951   R. C. PARKER   2,539,030
POWDER CHARGE WEIGHING MEANS
Filed Oct. 9, 1947   2 Sheets-Sheet 1
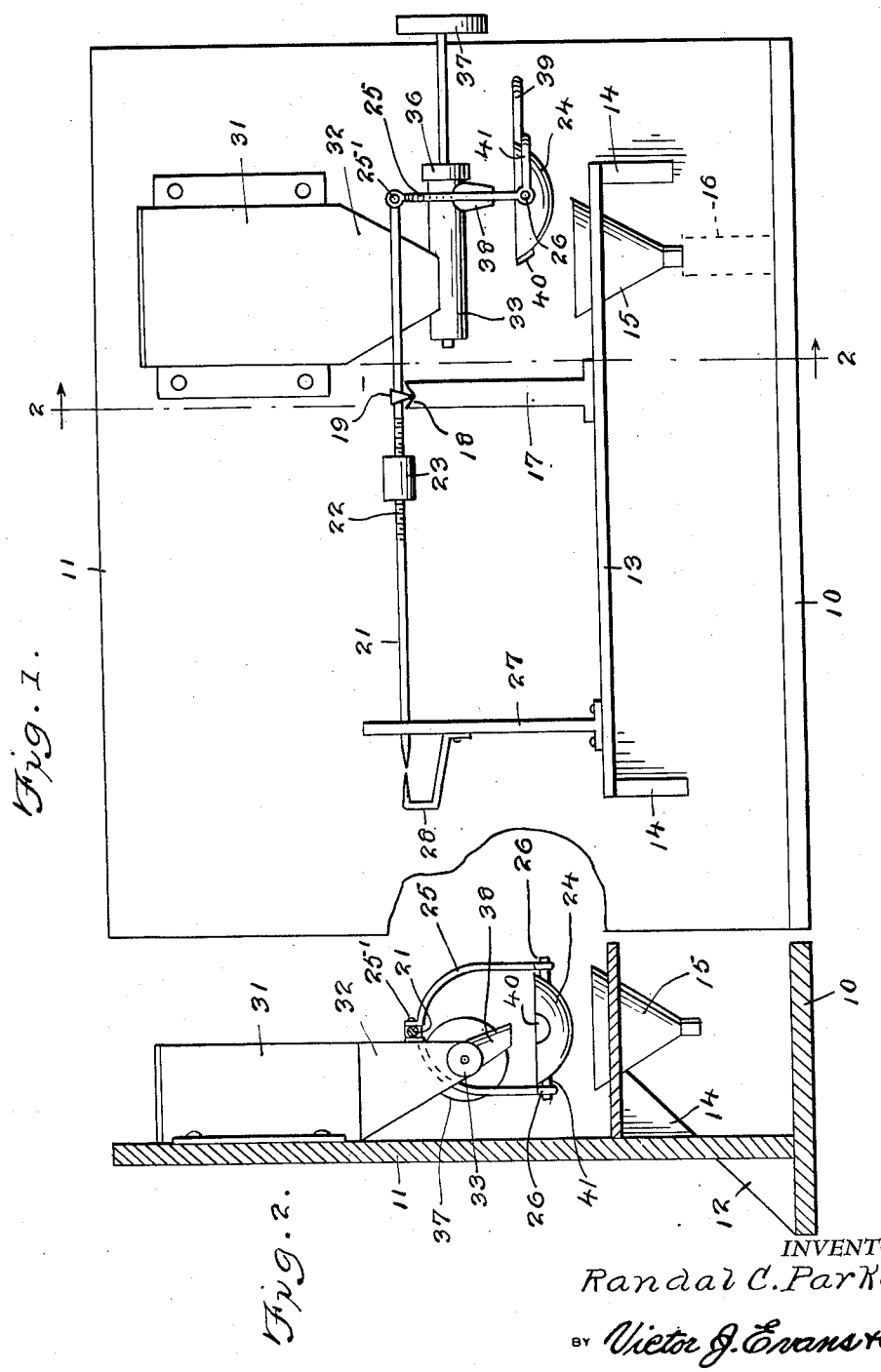
INVENTOR.
Randal C. Parker
BY Victor J. Evans & Co.
ATTORNEYS

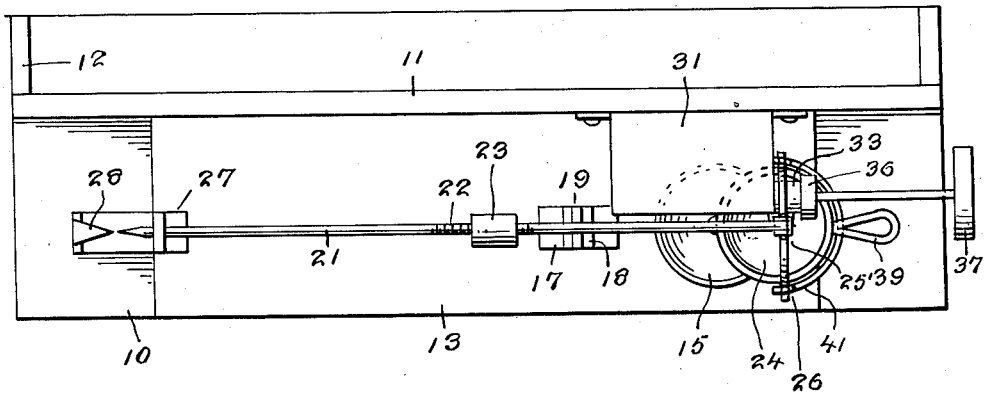
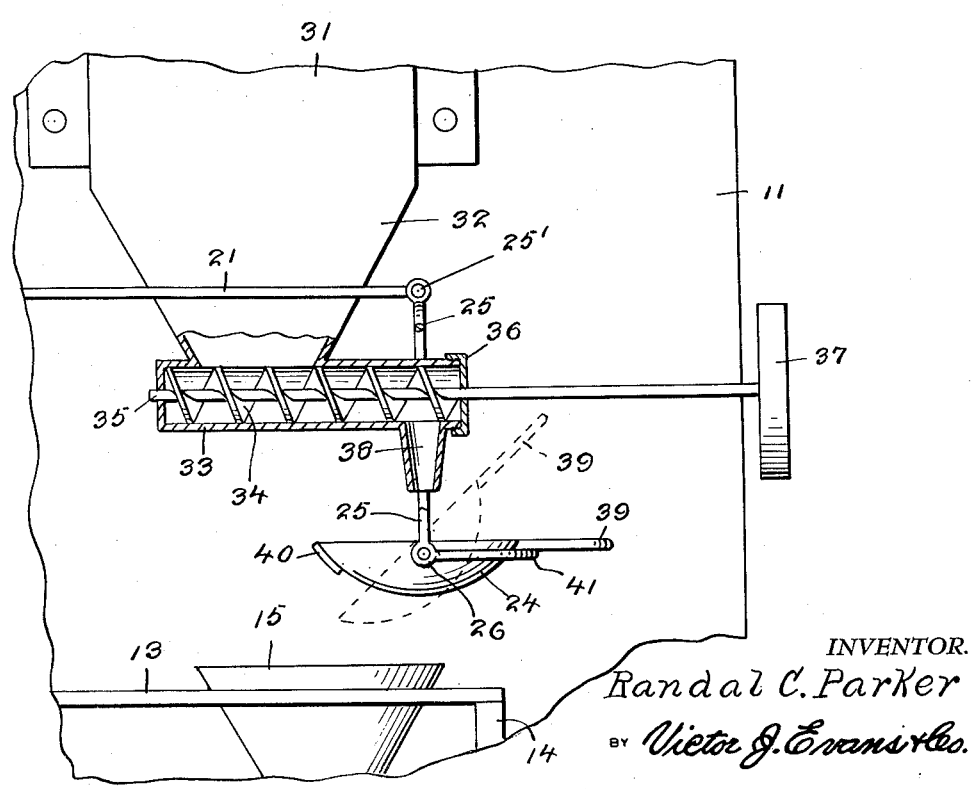

Patented Jan. 23, 1951

2,539,030

UNITED STATES PATENT OFFICE 2,539,030

POWDER CHARGE WEIGHING MEANS

Randal C. Parker, Hastings, Nebr.

Application October 9, 1947, Serial No. 778,975

1 Claim. (Cl. 265—49)

The invention relates to measuring charges of powder by weight.

It is an object of the present invention to provide a powder measure which can be operated with accuracy to reload ammunition wherein the powder can be measured by weight rather than volume to a fraction of a grain and can be easily and quickly dispensed and directed into the shell being filled without the requiring of a great many operations which become tiresome after filling a large number of ammunition shells.

Other objects of the present invention are to provide a powder measure wherein the powder can be measured by weight which is of simple construction, easy to operate, inexpensive to manufacture and efficient in operation.

For other objects and for a better understanding of the invention, reference may be had to the following detailed description taken in connection with the accompanying drawing, in which Fig. 1 is a front elevational view of my powder measure with the scales balanced.

Fig. 2 is a cross-sectional view in elevation taken on line 2—2 of Fig. 1.

Fig. 3 is a top plan view of the powder measure.

Fig. 4 is an enlarged fragmentary elevational view of my powder measure with portions broken away to show the interior of the powder feed device and illustrating in dotted lines the manner in which the scale pan is tilted to relieve it of its powder.

Referring now to the figures, 10 represents a base from which there is extended upwardly a backboard 11. The backboard 11 is braced upon the base 10 by a bracket 12. Extending outwardly from the front of the backboard is a shelf 13 retained by brackets 14. This shelf has an opening therein downwardly through which is extended a funnel 15 beneath which a shell can be disposed as indicated at 16, to receive the gun powder.

Extending upwardly from the top of the shelf is a central support 17 notched at its upper end as indicated at 18 to receive a knife edge 19 through which is extended a shaft 21 which is graduated at 22 so that a weight 23 can be extended to measure the weight of the powder which is deposited in a pan 24. This pan is supported upon a vertically disposed yoke 25 which is pivoted at its upper end at 25' to the rod 21, the pan having pivotal trunnion connections 26 with the lower end of the yoke so that the pan can be tilted to pour from it the powder into the funnel 15.

At the opposite end of the rod or beam 21, there is located a support 27 on which is an index finger 28 with which the pointed end of the rod beam 21 must be aligned for the scales to be in balance.

Above the pan 24, there is mounted a container 31 which is funnel-shaped at its bottom as shown at 32. On the lower end of the funnel, there is provided a sleeve portion 33 into which is extended a conveyor screw 34 journalled in one end of the sleeve 33 as indicated at 35 and in a cover 36 fitted on the open end of the sleeve portion 33. The screw 34 is operated by a hand wheel 37 whereby to convey the powder leaving the funnel portion 32 to a small outlet spout 38 for delivery into the pan 24. The pan 24 will receive the powder until the exact quantity by weight has been deposited therein, as determined by the location of the counterweight 23 on the rod beam 21.

The pan 24 has a handle 39 by means of which it can be tilted to deliver its contents to the funnel 15. To overcome the tendency of the handle 39 to tilt the pan 24, a counterbalance weight 40 is secured to the pan in diametrical opposed relation to the handle 39. A second yoke 41 formed on the lower ends of the yoke 25 extends at right angles from the yoke 25 to engage the handle 39. Thus the second yoke maintains the pan on an even plane. The spout 38 extends to the side and downwardly and the pan 24 is disposed a sufficient distance below the spout so that the tilting operation of the pan will not be interferred with by the spout. The pan 24 is accordingly offset from beneath the sleeve 33.

In operation, the scale is set to the desired weight of the gunpowder to be placed in the shell 16. The screw 34 is turned until the scale beam has arrived at the index 28 so that its pan is in balance with the weight 23. Thereafter, the hand is removed from the hand wheel and while keeping the shell 16 beneath the funnel, the pan handle 39 is grasped to tilt the pan 24 and to pour its contents through the funnel 15. After the shell has been filled, it can be removed and replaced by another shell. The operations are simple and do not become tiresome over any great length of time. The powder will be measured out with accuracy and to a fraction of a grain and its quantity will be by weight rather than by volume. The tiltable action of the pan permits accurate measurement of the powder, regardless of how it flows into the pan.

While various changes may be made in the detail construction, it shall be understood that such changes shall be within the spirit and scope of the present invention as defined by the appended claim.

I claim:

In a powder measure having a base, a vertical support extending upwardly from the base, a shelf extending from the support, a funnel mounted in the shelf extending downwardly therefrom and adapted to direct powder into an empty shell located on the base, and a container for the powder carried by the vertical support the improvement comprising a scale support extending upwardly from the shelf, a rod beam having a knife edge pivoted upon the scale support, a weight adjustable on the rod beam, an index with which one end of the rod beam may be aligned, a yoke pivotally mounted on said rod beam at its opposite end, a pan pivotally connected to the yoke on the rod beam over the funnel adapted to receive the powder from the container, said pan connected to the rod beam for tilting movement whereby a measured quantity of powder can be poured into the funnel by tilting the pan, and said pan is provided with a handle, a second yoke is provided on said first yoke at right angles thereto, to support the handle when the pan is arranged to receive the powder, and a counterbalancing weight on said pan in opposed relation to said handle.

RANDAL CHARLES PARKER.

REFERENCES CITED

The following references are of record in the file of this patent:

UNITED STATES PATENTS

| Number | Name | Date |
|---|---|---|
| 106,163 | How | Aug. 9, 1870 |
| 561,754 | Barney | June 9, 1896 |
| 615,937 | Wheeler | Dec. 13, 1898 |
| 1,949,844 | Seederer | Mar. 6, 1934 |